United States Patent [19]

Triem

[11] 3,708,153
[45] Jan. 2, 1973

[54] ENCLOSURE FOR LANDFILL DISPOSAL SITE

[76] Inventor: Leonard C. Triem, c/o Triem Steel and Processing, Inc., P. O. Box 215, Chicago Heights, Ill. 60411

[22] Filed: Oct. 6, 1971

[21] Appl. No.: 186,955

[52] U.S. Cl. ..................................256/25, 256/26
[51] Int. Cl. ..............................................E04h 17/16
[58] Field of Search................256/24, 25, 26, 32, 33; 119/20; 160/135, 351

[56] References Cited

UNITED STATES PATENTS

| | | | |
|---|---|---|---|
| 1,293,335 | 2/1919 | Chambliss | 256/24 |
| 2,691,359 | 10/1954 | Anstiss et al. | 256/25 X |
| 2,766,016 | 10/1956 | Miller et al. | 256/21 |
| 3,471,129 | 10/1969 | Mpakarakes | 256/25 X |

Primary Examiner—Dennis L. Taylor
Attorney—Hofgren, Wegner, Allen, Stellman & McCord

[57] ABSTRACT

A mobile screen enclosure for a landfill disposal site trench, to prevent paper and other light refuse from blowing about. The trench is bounded by parallel walls or mounds of dirt. A generally rectangular framework spans the trench and is supported on wheels which move on a track extending along the mounds, for the length of the trench. A screen covers the framework forming an enclosure of sufficient size to accommodate a truck delivering refuse and machine for compacting and covering the refuse. One end of the screen enclosure extends down into the trench and is provided with a door for passage of vehicles along the trench floor.

13 Claims, 9 Drawing Figures

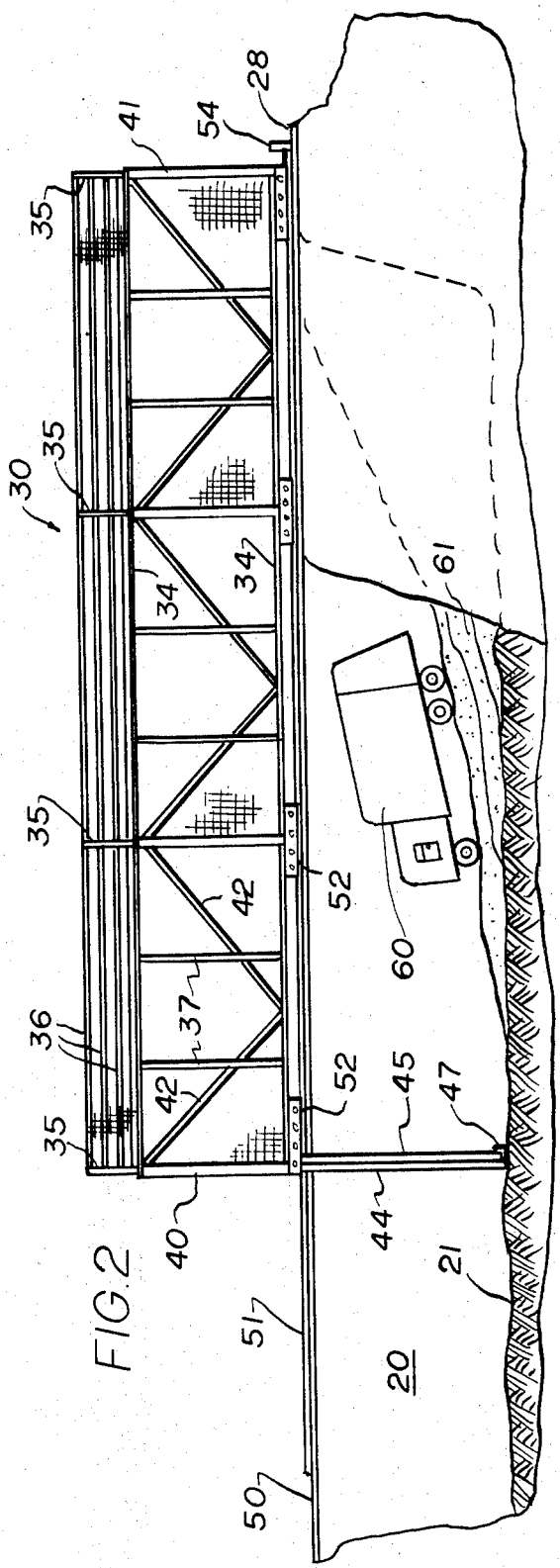
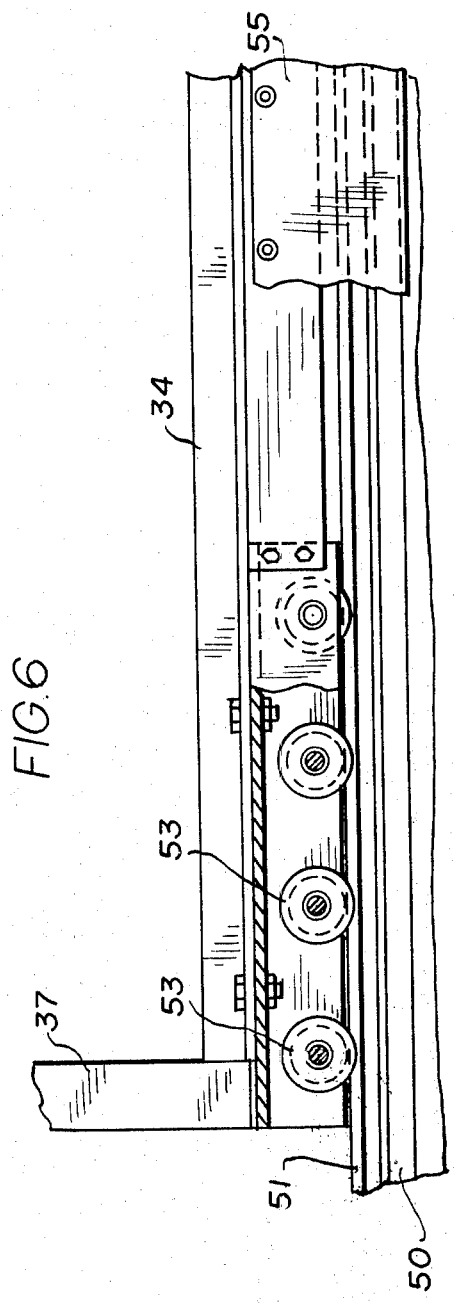
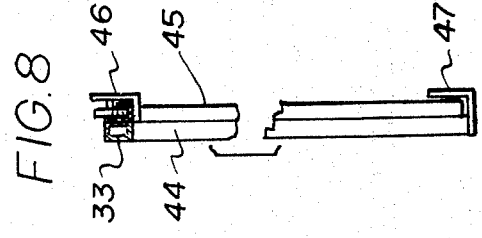

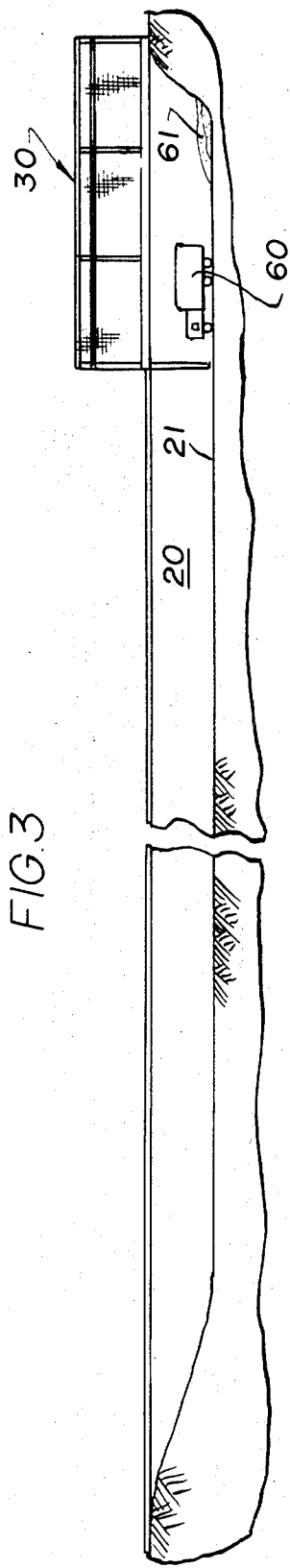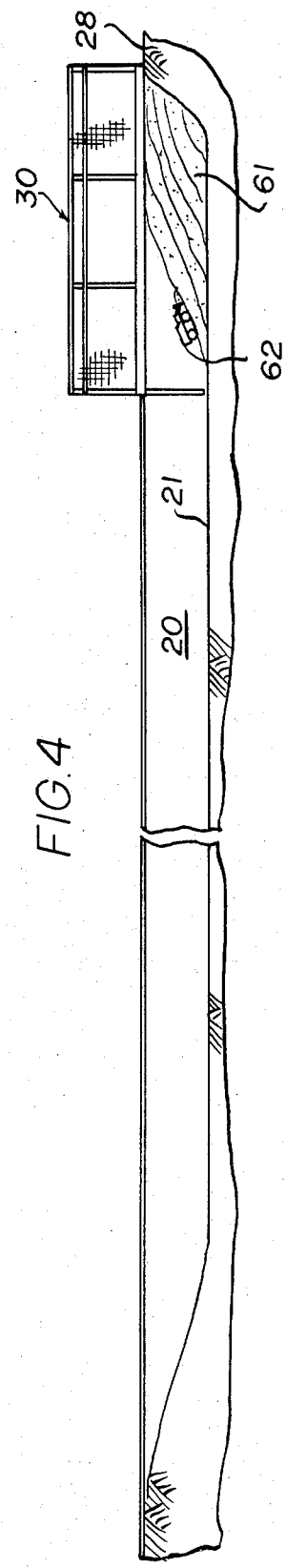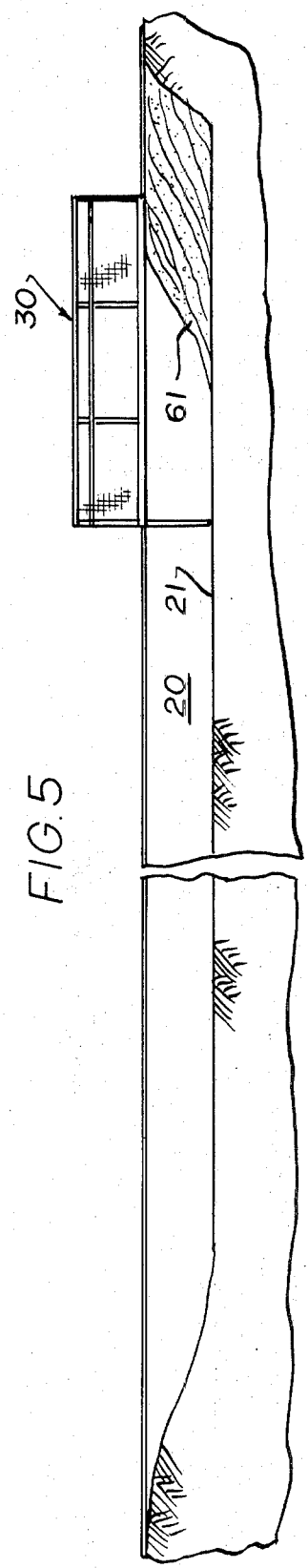

ENCLOSURE FOR LANDFILL DISPOSAL SITE

This invention is concerned with an enclosure for a landfill disposal site.

Generally, in a landfill disposal operation, a trench is dug and the dirt which is removed is mounded along the side. The trench is then filled with alternate layers of compacted refuse and soil until a final grade, often higher than the original level of the land, is reached. Paper and other light refuse blow about the trench and over the walls or mounds of dirt along the sides before it can be compacted and covered. Landfills are generally located in open country where winds blow unimpeded. The landfill site is usually surrounded by a fence, but it will generally be only a few feet high, much lower than the mounded dirt, and papers often blow over the fence. Even where they are caught by the fence, they are unsightly and must be collected by hand.

In order to alleviate this problem, my invention provides a screen enclosure within which refuse may be dumped, compacted and covered. The enclosure extends over a portion of the landfill trench. Papers which blow about cannot escape from the trench and it is not necessary that they be collected by hand. When the wind stops, the papers fall off the screen into the trench and are subsequently covered.

One feature of the invention is the provision of an enclosure having first and second supports, one on top of the wall or mound at either side of a landfill disposal trench with a framework spanning the trench and extending lengthwise thereof. A screen covering on the framework forms an enclosure and at one end extends downwardly into the trench, substantially to the floor thereof. The screen covering at the other end of the enclosure extends downward substantially to the level of the finish grade for the landfill site. As a section of the trench is filled, the enclosure is moved along the trench to an unfilled section.

Another feature of the invention is that a door is provided in the screen covering at one end of the enclosure for the entrance and exit of vehicles to the trench within the enclosure.

A further feature of the invention is that the supports include means for moving the enclosure longitudinally of the trench.

Yet another feature is that the length of the enclosure along the trench is greater than the horizontal extent of a slope which may be traversed by the compacting and covering machine, from the bottom of the trench to the level of the finish grade.

And a further feature is the provision of a flexible skirt extending downwardly from the screen to prevent refuse from blowing out under the enclosure.

Further features and advantages of the invention will readily be seen from the following specification and from the drawings, in which:

FIG. 2 is a longitudinal section through the enclosure and a portion of the trench, illustrating the filling operation;

FIGS. 3 through 5 are a series of reduced longitudinal sections through the trench and enclosure illustrating the progressive filling of the trench and movement of the enclosure;

FIG. 6 is a fragmentary enlarged side elevation illustrating a detail of the supporting wheels;

FIG. 8 is a fragmentary section illustrating the mounting of the door in the end of the enclosure.

Figure 1:
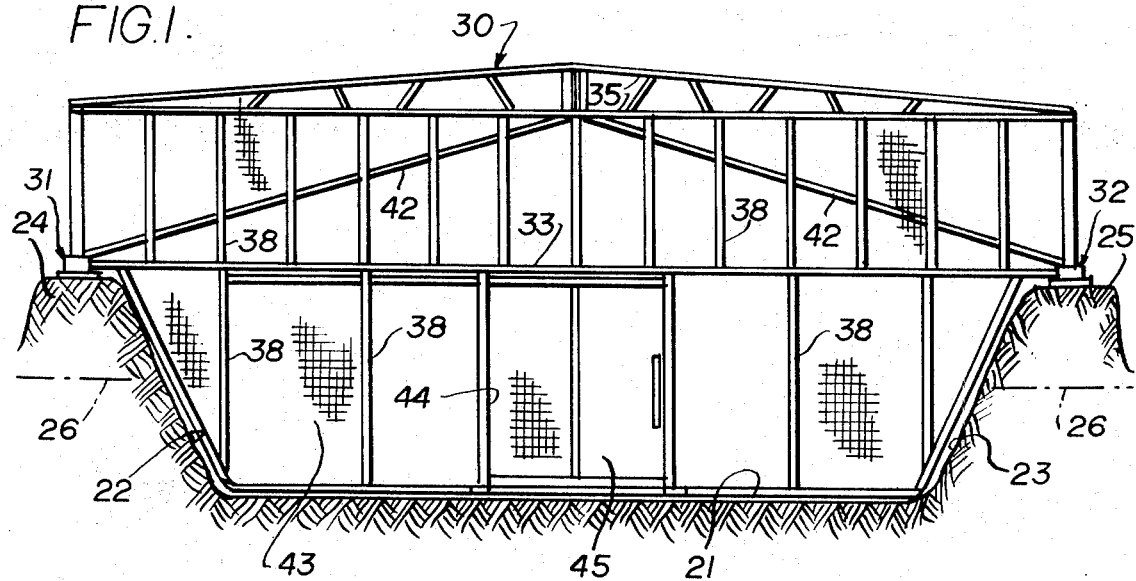
FIG. 1 is an end elevation of the enclosure, showing the trench in transverse section.

The general nature of the enclosure which is the subject of this invention and its relation to the trench in which a landfill disposal operation is carried out are illustrated in FIGS. 1 and 2. The trench 20 has a floor 21 and generally parallel lateral side walls 22 and 23 which may be formed in part by dirt mounds 24 and 25 extending above the original grade of the land, indicated by broken line 26. The trench illustrated in FIGS. 1 and 2 will, when filled, have a finish grade indicated at the level 28, at the top of mounds 24 and 25. In some cases, the finish grade may not be above the original land level, as when the landfill operation utilizes a worked-out strip mine, clay pit or the like.

The enclosure 30 has a framework supported from the tops of the mounds 24 and 25 as indicated generally in FIG. 1 at 31 and 32. The framework includes horizontal or lateral members 33 and 34 extending transversely and longitudinally of trench 20, respectively. Roof trusses 35 span the trench between longitudinal frame members 34 and are joined by longitudinally extending laterally spaced roof members 36. Vertical members 37 join the longitudinal framework members 34 while vertical members 38 define the ends of the enclosure framework and extend downwardly into trench 20 at one end 40 of the enclosure. At the other end 41, the framework terminates at the level of finish grade 28. Diagonal framework members 42 provide additional strength for the framework.

The sides, end and top of the framework are covered with screen material 43 forming an enclosure completely surrounding a portion of the trench 20.

An opening 44 is provided in the enclosure end wall 40, within the trench, to permit passage of trucks hauling refuse or dirt, or other equipment as a tractor or the like to enter and leave the enclosure. Opening 44 is closed by a gate 45 slidably supported on the framework from an overhead track 46, FIG. 8, and guided by a channel 47 at the bottom.

Figure 7:
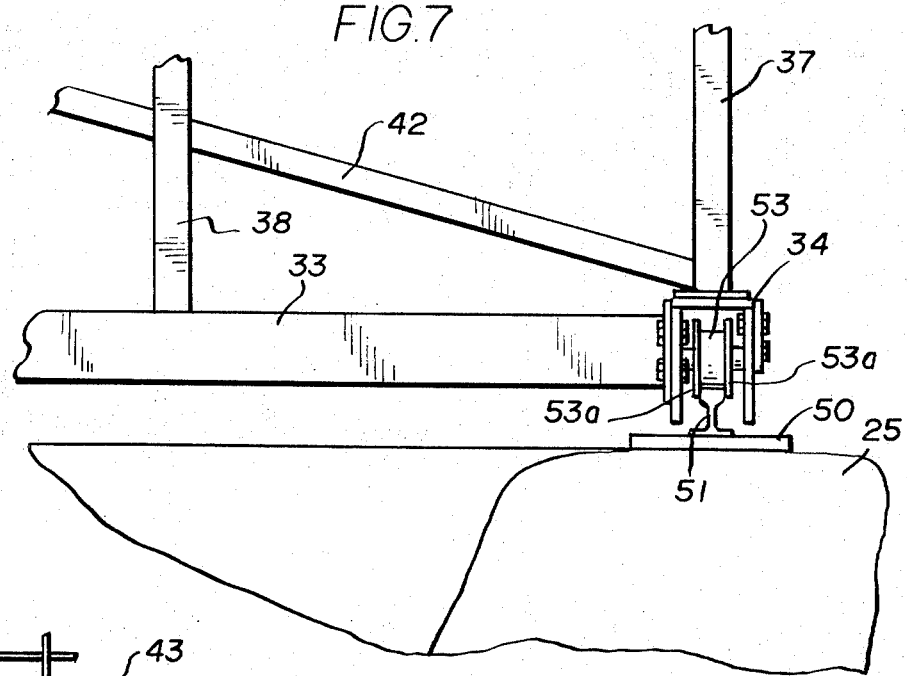
FIG. 7 is a fragmentary enlarged end elevation illustrating the supporting wheels.

The supports 31 and 32 for the enclosure provide for movement of the enclosure along the length of the trench 20. Concrete ribbons 50 on top of each mound 24 and 25 each support a rail 51. The framework of the enclosure is provided with spaced sets 52 of wheels 53 which carry the entire structure on the rails, FIGS. 6 and 7. The wheel sets 52 are joined together by longitudinal framework members 34. Wheels 53 are preferably provided with a double flange 53a to guide the enclosure along the rails. A stop 54 at the end of the trench prevents the enclosure from leaving the rails.

Figure 9:
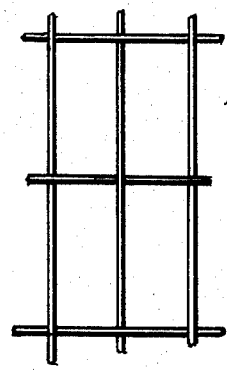
FIG. 9 is an enlarged fragmentary detail of the screen.

The screen 43 which forms the enclosure is of a fine enough mesh to catch and hold paper and other light refuse which might blow about in the wind. It should not be so fine as to present a substantial resistance to wind which would impose heavy wind loads on the framework. Preferably the screening is an unclimbable wire netting illustrated in FIG. 9 having a mesh of the order of 2 inches wide and 4 inches high. With these dimensions, it is unlikely that children or others will climb on the enclosure. The screening may be electrically charged as with an electrical fence energizer (not shown) to discourage people or animals from climbing on the enclosure. Such a precaution is not necessary during the time the enclosure is in use, and the energizer need only be turned on when the landfill operation is closed. If the concrete ribbon does not provide sufficient insulation for the enclosure, the screening may be electrically isolated from the framework by insulators.

It is preferable that the enclosure 30 be provided with a flexible skirt 55 secured to the bottom of the framework as illustrated in FIG. 6, and extending downwardly into contact with the ground to prevent refuse from blowing under the enclosure. Skirt 55 preferably extends along both sides of the enclosure and along end wall 41, at the level of the finish grade and is of a flexible material as screening, rubber or canvas, to accommodate irregularities in the ground. If there is a problem with material blowing under the portion of end wall 40 which extends downwardly into the trench, a skirt may be provided there also.

FIGS. 3, 4 and 5 illustrate the operation of a sanitary landfill utilizing the enclosure of this invention. In FIG. 3, enclosure 30 is at the far right end of trench 20. A truck 60 has just dumped a load of refuse 61 on the trench floor 21 and is leaving the enclosure. The refuse 61 is compacted and covered with a layer of soil. This is commonly done by a crawler tractor 62, FIG. 4, equipped with a bulldozer blade. FIG. 4 several layers of refuse and soil have been deposited within enclosure 30, filling trench 20 to the finish grade 28. When this has been accomplished, enclosure 30 is moved to the left as shown in FIG. 5, to permit activity within an adjacent section of the trench. This procedure is continued until the trench is filled.

In a typical landfill disposal operation, a trench may have a width of 100 feet and be several hundred feet long. A depth of 15 to 20 feet is common. The length of enclosure 30 should be greater than the horizontal extent of a slope which may be traversed by the tractor 62 between the trench floor 21 and the level of finish grade 28. This permits complete filling of the trench within the enclosure. The height of the enclosure above the finish level should accommodate at least the tractor 62 and is preferably great enough to clear the truck 60. Where the trench is sufficiently wide, as 100 feet for example, several trucks may enter the enclosure at one time to dump their loads. The enclosure will also accommodate one or two tractors spreading and compacting the refuse and a suitable machine bringing in cover soil.

Where a disposal site has room for more than one trench, only one need be provided with a mobile enclosure. This trench would be utilized for dumping only on windy days. At other times, dumping could be carried out in an open trench.

I claim:

1. An enclosure for a landfill disposal site having an elongated trench with a floor between two generally parallel walls, the trench being filled to a finish grade over a period of time with compacted layers of refuse and soil, comprising:
   first and second supports one on top of the wall at either side of the trench;
   a framework carried by said supports, spanning the trench and extending lengthwise thereof to define the outline of an enclosure; and
   a screen covering on said framework forming an enclosure to contain blowing refuse, said covering at one end of the enclosure extending downwardly into the trench and substantially to the floor thereof, the enclosure being of sufficient size to accommodate a truck delivering refuse for disposal and a machine for compacting and covering the refuse.

2. The enclosure of claim 1 in which the screen covering in the other end of the enclosure extends downwardly substantially to said finish grade.

3. The enclosure of claim 2 in which the enclosure is generally rectangular in horizontal cross-section.

4. The enclosure of claim 1 including an opening in the screen covering of an end of the enclosure, for the entrance and exit of vehicles to the trench within the enclosure, and a gate for closing the opening.

5. The enclosure of claim 4 in which said opening is in the screen at said one end of the enclosure and within said trench for passage of vehicles along the trench floor.

6. The enclosure of claim 4 in which said gate is a screen panel slidable laterally of the trench, generally in the plane of the screen covering at the end of the enclosure.

7. The enclosure of claim 1 in which said first and second supports include means for moving the enclosure longitudinally of the trench.

8. The enclosure of claim 7 in which said moving means are wheels on which the enclosure is supported.

9. The enclosure of claim 8 having plural wheels spaced along the framework on each side of the trench.

10. The enclosure of claim 8 in which said wheels are flanged and the supports include a rail at the top of the wall on either side of said trench and extending the length of the trench, the spacing between said rails being the same along the length of the trench, and said wheels carrying the enclosure on said tracks.

11. The enclosure of claim 2 in which the length of the enclosure along the trench is greater than the horizontal extent of a slope traversible by said machine, from the bottom of the trench to the level of the finish grade.

12. The enclosure of claim 2 having a height above the finish level which is greater than the height of the refuse delivery truck or the machine.

13. The enclosure of claim 1, including a flexible skirt extending downwardly from the screen of the enclosure and toward the ground to prevent refuse from blowing under the enclosure.

* * * * *